United States Patent
Parolini et al.

(10) Patent No.: US 11,746,064 B2
(45) Date of Patent: Sep. 5, 2023

(54) SYSTEMS AND METHODS FOR INFILTRATING POROUS CERAMIC MATRIX COMPOSITE (CMC) PREFORMS

(71) Applicant: General Electric Company, Schenectady, NY (US)

(72) Inventors: Jason Robert Parolini, Anderson, SC (US); Canan Uslu Hardwicke, Greenville, SC (US); Srikanth Chandrudu Kottilingam, Greenville, SC (US); James Joseph Murray, III, Mauldin, SC (US)

(73) Assignee: General Electric Company, Schenectady, NY (US)

( * ) Notice: Subject to any disclaimer, the term of this patent is extended or adjusted under 35 U.S.C. 154(b) by 746 days.

(21) Appl. No.: 16/433,362

(22) Filed: Jun. 6, 2019

(65) Prior Publication Data

US 2020/0385315 A1 Dec. 10, 2020

(51) Int. Cl.
*C04B 41/45* (2006.01)
*C04B 41/00* (2006.01)
*C04B 41/85* (2006.01)

(52) U.S. Cl.
CPC ........ *C04B 41/4523* (2013.01); *C04B 41/009* (2013.01); *C04B 41/4515* (2013.01); *C04B 41/85* (2013.01)

(58) Field of Classification Search
CPC .............. C04B 41/009; C04B 41/4525; C04B 41/4523
See application file for complete search history.

(56) References Cited

U.S. PATENT DOCUMENTS 5,322,109 A 6/1994 Cornie
6,641,893 B1 * 11/2003 Suresh ................... C04B 41/86
428/113

(Continued)

FOREIGN PATENT DOCUMENTS

EP 1676824 A1 7/2006

OTHER PUBLICATIONS

PCT Search Report and Opinion issued in connection with corresponding PCT Application No. 20177618.4 dated Oct. 5, 2020, 9 pages.
PCT Search Report and Opinion issued in connection with corresponding PCT Application No. PCT/US2020/028284 dated Sep. 14, 2020, 19 pages.

(Continued)

*Primary Examiner* — Nathan H Empie
(74) *Attorney, Agent, or Firm* — James Pemrick; Charlotte Wilson; Hoffman Warnick LLC

(57) ABSTRACT

Systems and methods for infiltrating porous ceramic matrix composite (CMC) preforms to form CMC articles are disclosed. One method may include positioning the porous CMC preform in an opening of a die set for an infiltration system, and flowing a molten densifier over the porous CMC preform in a first flow direction to infiltrate a plurality of voids formed between each of a plurality of ply stacks of the CMC preform. The method may also include flowing the molten densifier over the porous CMC preform in a second flow direction, distinct from the first flow direction, to infiltrate the plurality of voids formed between each of the plurality of ply stacks of the CMC preform. The second flow direction may be substantially parallel to a predetermined, unidirectional material orientation of at least one ply stack of the plurality of ply stacks of the CMC preform.

11 Claims, 10 Drawing Sheets

(56) References Cited

U.S. PATENT DOCUMENTS

| | | |
|---|---|---|
| 6,737,168 B1 | 5/2004 | Yamagata et al. |
| 6,767,602 B1 | 7/2004 | Duval et al. |
| 9,234,430 B2 | 1/2016 | Cairo et al. |
| 11,117,839 B2 | 9/2021 | Parolini et al. |
| 2004/0127600 A1* | 7/2004 | Bauer .................. F16D 69/028 523/152 |
| 2005/0184413 A1 | 8/2005 | Forest et al. |
| 2006/0141257 A1 | 6/2006 | Subramanian et al. |
| 2006/0163733 A1 | 7/2006 | Chao et al. |
| 2012/0156466 A1* | 6/2012 | Bell ........................ C04B 35/83 428/297.4 |
| 2014/0007515 A1 | 1/2014 | Sigalas et al. |
| 2018/0244583 A1 | 8/2018 | Golling et al. |

OTHER PUBLICATIONS

U.S. Appl. No. 16/393,360, Non-Final Office Action dated Feb. 26, 2021, 18 pgs.

Singaporean Search Report for corresponding SG Application No. 10202004807T dated Dec. 20, 2022, 2 pages.

Singaporean Written Opinion for corresponding SG Application No. 10202004807T dated Dec. 21, 2022, 6 pages.

Notification of Transmittal of International Preliminary Report on Patentability issued in connection with corresponding PCT Application No. PCT/US2020/028284 dated Jan. 22, 2021, 7 pages.

U.S. Appl. No. 16/393,360, Final Office Action dated Jun. 30, 2021, 14 pages.

U.S. Appl. No. 16/393,360, Notice of Allowance dated Jul. 28, 2021, 12 pages.

\* cited by examiner

US 11,746,064 B2

SYSTEMS AND METHODS FOR INFILTRATING POROUS CERAMIC MATRIX COMPOSITE (CMC) PREFORMS

BACKGROUND OF THE INVENTION

The disclosure relates generally to ceramic matrix composite (CMC) articles, and more particularly, to systems and methods for infiltrating porous CMC preforms to form CMC articles.

Ceramic matrix composite (CMC) articles are generally considered well suited for structural components of a turbine engine due to, for example, their thermal resistance, high temperature strength, and chemical stability. However, CMC articles in a turbine engine can suffer from damage due to overstressing, excessive temperatures, improper formation, etc. One technique for addressing the damage-prone nature of the CMC articles is densification. However, conventional systems and methods for performing densification can create, for example, obstructions, cracks, and/or areas of reduced material and cause weaknesses within the CMC article. These drawbacks with conventionally densified CMC articles tend to be exacerbated the thicker the CMC article.

Conventional techniques for casting parts (e.g., metal casting) include injection molding, high pressure die casting, and low pressure die casting. However, none of these conventional techniques for casting have been utilized to perform the densification process on CMC articles because the operational parameters for performing the techniques may increase the likelihood and/or may cause damage to the CMC articles when performing the densification process.

BRIEF DESCRIPTION OF THE INVENTION

A first aspect of the disclosure provides a method for infiltrating a porous ceramic matrix composite (CMC) preform. The method includes: positioning the porous CMC preform in an opening of a die set for an infiltration system, the CMC preform including: a plurality of ply stacks, each of the plurality of ply stacks including a predetermined, unidirectional material orientation, and a plurality of voids formed between each of the plurality of ply stacks; flowing a molten densifier over the porous CMC preform in a first flow direction to infiltrate the plurality of voids formed between each of the plurality of ply stacks of the CMC preform; and flowing the molten densifier over the porous CMC preform in a second flow direction, distinct from the first flow direction, to infiltrate the plurality of voids formed between each of the plurality of ply stacks of the CMC preform, wherein the second flow direction is substantially parallel to the predetermined, unidirectional material orientation of at least one ply stack of the plurality of ply stacks of the CMC preform.

A second aspect of the disclosure provides a system including: a die set including an opening for receiving a porous ceramic matrix composite (CMC) preform; a first molten densifier supply conduit in communication with the opening of the die set in a first location of the die set, the first molten densifier supply conduit flowing a molten densifier to the opening of the die set in a first flow direction to infiltrate a plurality of voids formed between each of a plurality of ply stacks of the CMC preform; and a second molten densifier supply conduit in communication with the opening of the die set in a second location of the die set, the second molten densifier supply conduit flowing the molten densifier to the opening of the die set in a second flow direction substantially parallel to a predetermined, unidirectional material orientation of at least one ply stack of the plurality of ply stacks of the CMC preform to infiltrate the plurality of voids formed between each of the plurality of ply stacks of the CMC preform.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within the disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

As indicated above, the disclosure relates generally to ceramic matrix composite (CMC) articles, and more particularly, to systems and methods for infiltrating porous CMC preforms to form CMC articles.

These and other embodiments are discussed below with reference to FIGS. 1-10. However, those skilled in the art will readily appreciate that the detailed description given herein with respect to these Figures is for explanatory purposes only and should not be construed as limiting.

Figure 1:
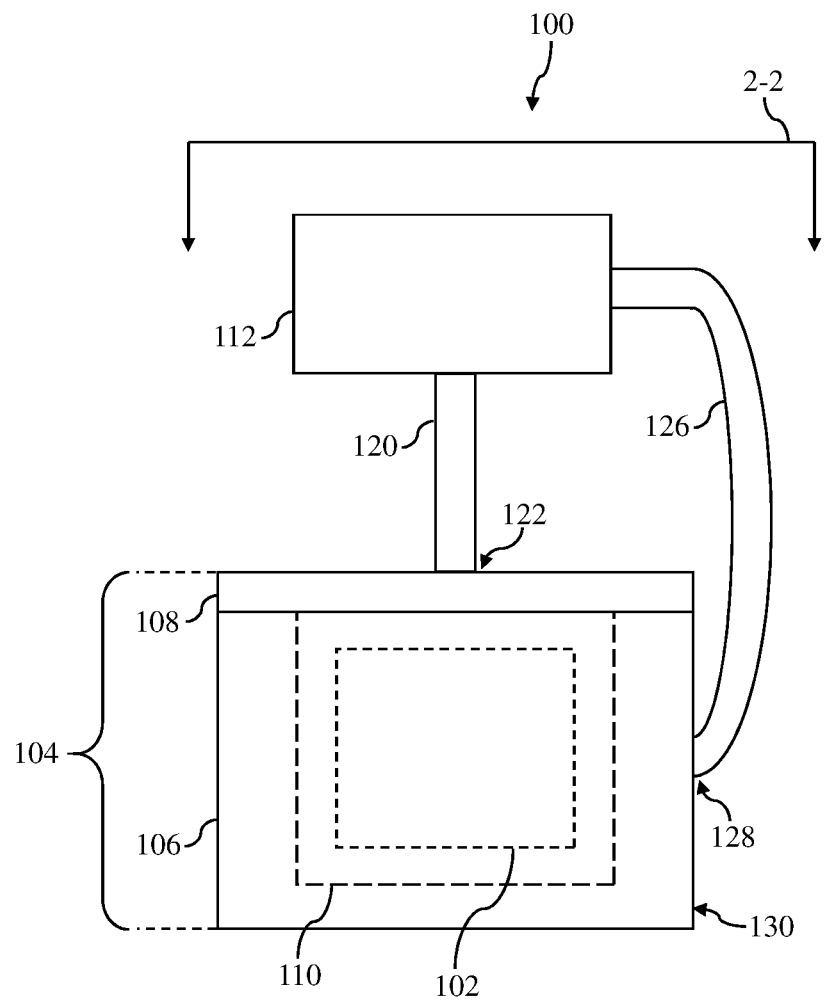
FIG. 1 shows a schematic view of a system for infiltrating a porous ceramic matrix composite (CMC) preform to form a CMC article, according to embodiments of the disclosure.
Figure 2:
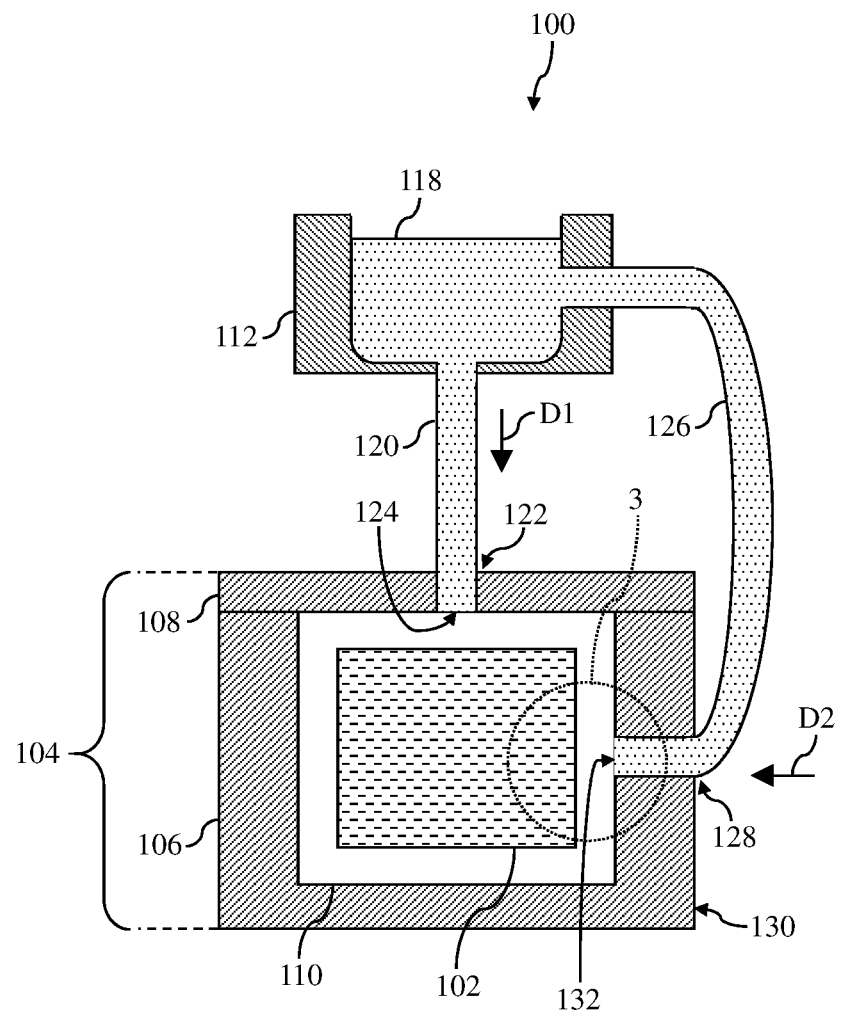
FIG. 2 shows a front cross-sectional of the system and the CMC preform taken along line 2-2 in FIG. 1, according to embodiments of the disclosure.

FIGS. 1 and 2 show various views of a system 100 capable of infiltrating a porous ceramic matrix composite (CMC) preform 102 (hereafter, "CMC preform 102") included therein. More specifically, FIG. 1 shows a schematic view of system 100 and CMC preform 102 (shown in phantom) and FIG. 2 shows a front cross-section view of system 100 and CMC preform 102 taken along line 2-2 in FIG. 1. As discussed herein, system 100 may be configured to flow a molten densifier over CMC preform 102 to infiltrate and/or densify preform 102 to create a CMC article (not shown) that may be utilized in various systems and/or devices (e.g., hot gas path components in turbine systems).

System 100 may include a die set 104 configured to receive preform 102 for infiltration, as discussed herein. In the non-limiting example, die set 104 may include a first portion 106 and a second portion 108 positioned on and/or coupled to first portion 106. Die set 104 may also include opening 110 formed therein. Specifically, opening 110 may be formed in first portion 106 and/or may be formed between first portion 106 and second portion 108 of die set 104. As shown in FIGS. 1 and 2, opening 110 may receive, house, and/or hold CMC preform 102 during the infiltration process performed using system 100. Die set 104 may be formed from any suitable material that may receive CMC preform 102 and withstand the pressures and/or material exposure temperatures (e.g., molten densifier) experienced when performing the infiltration process on CMC preform 102, as discussed herein. Additionally, although opening 110 of die set 104 is shown as be substantially polygonal/quadrilateral, it is understood that opening 110 may be formed as and/or may include any configuration for receiving CMC preform 102 to perform the infiltration process.

Figure 9:
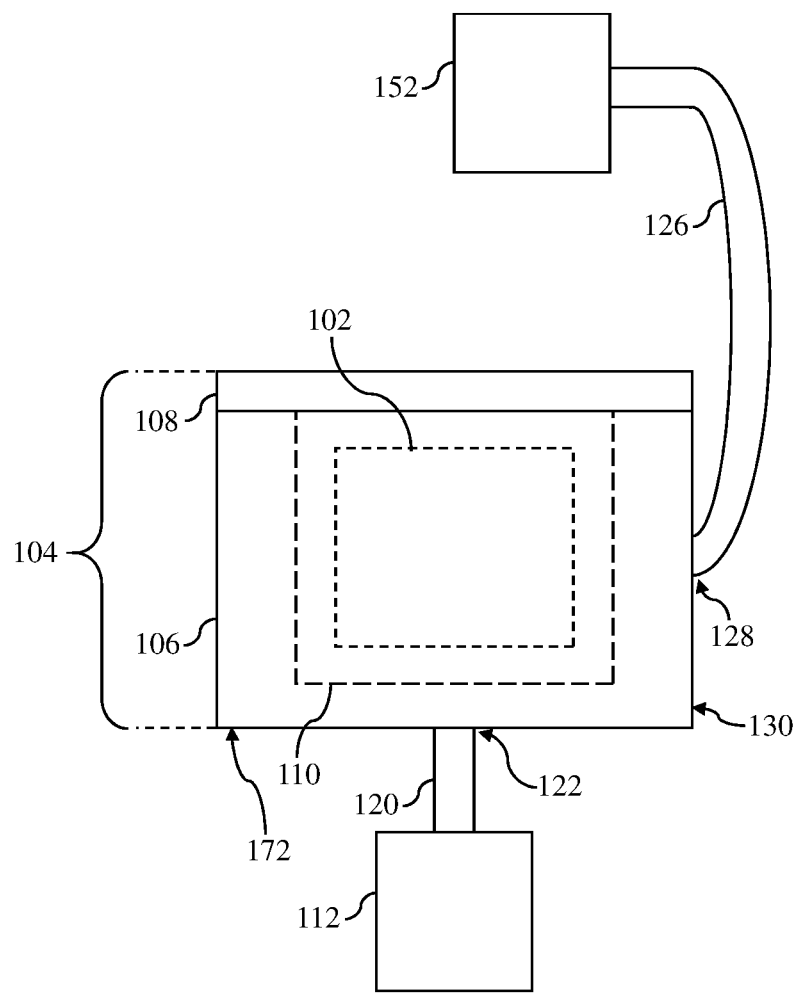
FIG. 9 shows another schematic view of a system for infiltrating a porous ceramic matrix composite (CMC) preform to form a CMC article, according to further embodiments of the disclosure.

As shown in FIGS. 1 and 2, system 100 may also include at least one molten densifier source 112. Molten densifier source 112 of system 100 may hold, contain, and/or store a molten densifier 118 (FIG. 2) that may be supplied to, flow over, and/or infiltrate CMC preform 102 during the infiltration process, as discussed herein. Molten densifier 118 may include any suitable molten source of a compound or composition capable of infiltrating CMC preform 102 and/or increasing the density of CMC preform 102 to form a CMC article (not shown). For example, molten densifier 118 may include one or more molten sources of silicon. Although a single molten densifier source 112 is shown in FIGS. 1 and 2, it is understood that system 100 may include more sources for providing molten densifier 118 to opening 110 of die set 104 during the infiltration process (FIG. 9).

Figure 3:
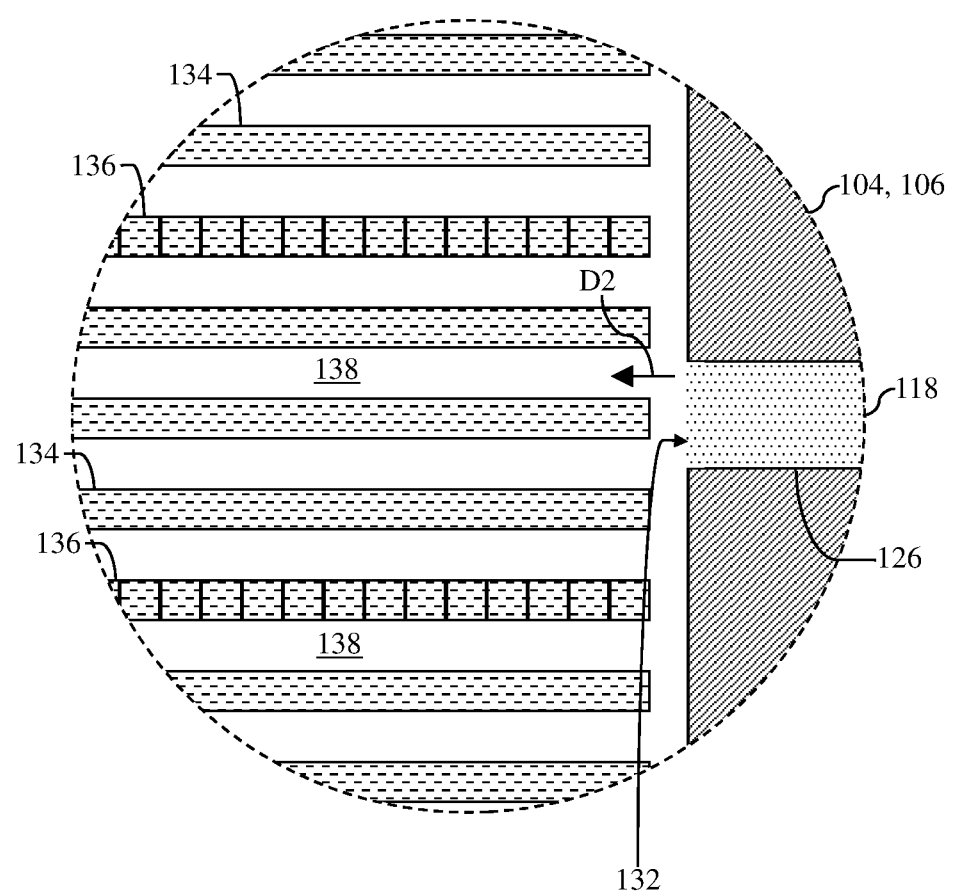
FIG. 3 shows an enlarged view of a portion of FIG. 2 including the system and the CMC preform, according to embodiments of the disclosure.

Molten densifier source 112 may be in communication with die set 104 via a plurality of supply conduits. For example, molten densifier source 112 may be in communication with a first molten densifier supply conduit 120 (hereafter, "first supply conduit 120"). First supply conduit 120 may also be in communication with opening 110 of die set 104 and/or may couple molten densifier source 112 to opening 110 of die set 104. As discussed herein, first supply conduit 120 may provide, supply, and/or flow molten densifier 118 (FIG. 2) to opening 110 in a first flow direction D1 (FIG. 2) during the infiltration process to infiltrate a plurality of voids of CMC preform 102 formed between each of the plurality of ply stacks forming CMC preform 102 (FIG. 3). First supply conduit 120 may be in communication with die set 104 in a first location 122 of die set 104. In the non-limiting example shown in FIGS. 1 and 2, first location 122 of first supply conduit 120 may be at and/or through second portion 108 of die set 104. Additionally, first location 122 of first supply conduit 120 may also be substantially above opening 110 and/or CMC preform 102 positioned within opening 110 of die set 104. As such, and as discussed herein, first supply conduit 120 positioned in the first location 122 of die set 104 within system 100 may provide, supply, and/or flow molten densifier 118 over the top or upper-most surface of CMC preform 102, and infiltrate the voids within CMC preform 102 from top to bottom.

Briefly turning to FIG. 2, first supply conduit 120 may also include an inlet 124 in direct communication with opening 110 of die set 104. In the non-limiting example where first supply conduit 120 is positioned in first location 122 (e.g., above CMC preform 102), first supply conduit 120 may flow and/or supply molten densifier 118 to opening 110 and/or CMC preform 102 in the first flow direction (D1) at a pressure equal to (or lower than) atmospheric pressure. That is, and as shown in FIGS. 1 and 2, molten densifier source 112 and first supply conduit 120 may be configured as a gravity fed system that may flow molten densifier 118 at a pressure equal to (or lower than) atmospheric pressure. In other non-limiting examples discussed herein (FIG. 4), first supply conduit 120 may flow and/or supply molten densifier 118 in the first flow direction (D1) at a pressure greater than or above atmospheric pressure.

Additionally, and as shown in FIGS. 1 and 2, molten densifier source 112 may be in communication with a second molten densifier supply conduit 126 (hereafter, "second supply conduit 126"). Similar to first supply conduit 120, second supply conduit 126 may be in communication with opening 110 of die set 104 and/or may couple molten densifier source 112 to opening 110 of die set 104. As discussed herein, second supply conduit 126 may provide, supply, and/or flow molten densifier 118 (FIG. 2) to opening 110 in a second flow direction D2 (FIG. 2) during the infiltration process to infiltrate a plurality of voids of CMC preform 102 formed between each of the plurality of ply stacks forming CMC preform 102 (FIG. 3). In the non-limiting example, second supply conduit 126 may be in communication with die set 104 in a second location 128 of die set 104, distinct from first location 122 of first supply conduit 120. As shown in FIGS. 1 and 2, second location 128 of second supply conduit 126 may be at and/or through a sidewall 130 of first portion 106 of die set 104. Additionally, second location 128 of second supply conduit 126 may also be positioned substantially adjacent to, next to, and/or horizontal from opening 110 and/or CMC preform 102 positioned within opening 110 of die set 104. As such, and as discussed herein, second supply conduit 126 positioned in the second location 128 of die set 104 within system 100 may provide, supply, and/or flow molten densifier 118 through a side of CMC preform 102, and infiltrate the voids within CMC preform 102 from the side(s).

As shown in FIG. 2, and also similar to first supply conduit 120, second supply conduit 126 may also include an inlet 132 in direct communication with opening 110 of die set 104. In the non-limiting example where second supply conduit 126 is positioned in second location 128 (e.g., adjacent to CMC preform 102), and molten densifier source 112 is positioned above or elevated from second location 128, second supply conduit 126 may flow and/or supply molten densifier 118 to opening 110 and/or CMC preform 102 in the second flow direction (D2) at a pressure equal to (or lower than) atmospheric pressure (e.g., gravity fed system). In other non-limiting examples discussed herein (FIG. 4), second supply conduit 126 may flow and/or supply molten densifier 118 in the second flow direction (D2) at a pressure greater than or above atmospheric pressure.

Turning to FIG. 3, and with continued reference to FIGS. 1 and 2, an enlarged view of a portion of CMC preform 102 and system 100 of FIG. 2 is shown. In the non-limiting example, CMC preform 102 may include a plurality of ply stacks 134, 136 of material. Each ply stack 134, 136 of CMC preform 102 may include a plurality of processed fibers that be formed into a solitary sheet of material, sometimes referred to as "tape." The fibers in each ply stack 134, 136 may include a predetermined, unidirectional material orientation. For example, and as shown in FIG. 3, ply stacks 134 may include fibers having a first predetermined, unidirectional material orientation that extend across and/or from left-to-right on the page when viewed in the front cross-sectional view (FIG. 2). Distinct from ply stacks 134, ply stacks 136 may include fibers having a distinct predetermined, unidirectional material orientation that extend through and/or from in-and-out of the page when viewed in the front cross-sectional view (FIG. 2). CMC preform 102 may include the plurality of ply stacks 134, 136 stacked and/or positioned on one another to form CMC article (not shown) after the infiltration process discussed herein. Additionally, the pattern and/or order in which ply stacks 134, 136 are stacked, positioned on one another, and/or oriented to form CMC preform 102 may be dependent on the build structure and/or the CMC article to be formed from CMC preform 102. For example, and as shown in FIG. 3, CMC preform 102 may include more ply stacks 134 than ply stacks 136 due to the properties (e.g., rigidity, ductility, flexibility, and so on) of ply stacks 134, 136 and the required properties for CMC article formed from CMC preform 102.

Additionally, and as shown in FIG. 3, CMC preform 102 may also include a plurality of voids 138. Voids 138 of CMC preform 102 may be formed between each ply stack 134, 136 as a result of the formation and/or stacking of ply stacks 134, 136 to form CMC preform 102. In order to form a CMC article from CMC preform 102, voids 138 formed in CMC preform 102 must be substantially closed and/or filled. As discussed herein, system 100 may flow or supply molten densifier 118 to opening 110 of die set 104 to flow through and/or between ply stack 134, 136 to substantially fill voids 138 during infiltration process, and perform a densification process on CMC preform 102.

Briefly returning to FIG. 2, and as discussed herein, first supply conduit 120 is in communication with opening 110 of die set 104 in first location 122 (e.g., second portion 108, above CMC preform 102) for flowing molten densifier 118 over CMC preform 102. In the non-limiting example, because first location 122 is above and/or over CMC preform 102 and/or opening 110 of die set 104, the first flow direction (D1) in which first supply conduit 120 may flow, supply, and/or provide molten densifier 118 is substantially up-and-down on the page. Additionally, and with reference to FIG. 3, the first flow direction (D1) of molten densifier 118 provided, supplied, and/or flowed over CMC preform 102 may be substantially perpendicular to CMC preform 102, and more specifically, perpendicular to the predetermined, unidirectional material orientation of at least one ply stack 134, 136 of CMC preform 102. First flow direction (D1) of molten densifier 118 supplied or flowed by first supply conduit 120 may be substantially perpendicular to the predetermined, unidirectional material orientation of at least one ply stack 134, 136 of CMC preform 102 as a result of, at least in part, first supply conduit 120 being positioned in first location 122 of die set 104 and/or the orientation and/or pattern of the plurality of ply stacks 134, 136 forming CMC preform 102.

As shown in FIG. 3, and as discussed herein, second supply conduit 126 may be formed in die set 104 in second location 128 (e.g., sidewall 130—FIG. 1) to supply or flow molten densifier 118 to opening 110 and/or flow molten densifier 118 over CMC preform 102 in the second flow direction (D2). In the non-limiting example, the second flow direction (D2) may be substantially parallel with the predetermined, unidirectional material orientation of at least one ply stack 134, 136 of CMC preform 102. More specifically, the second flow direction (D2) of molten densifier 118 flowed, supplied, and/or provided by second supply conduit 126 may be substantially parallel to the predetermined, unidirectional material orientation of ply stacks 134 of CMC preform 102. By orienting second supply conduit 126 (and/or inlet 132) to flow molten densifier 118 in the second flow direction (D2) substantially parallel with the predetermined, unidirectional material orientation of ply stacks 134 of CMC preform 102, molten densifier 118 may flow through, fill, and/or infiltrate voids 138 of CMC preform 102 more efficiently and/or more effectively. Flowing molten densifier substantially parallel with the predetermined, unidirectional material orientation of ply stacks 134 of CMC preform 102 may improve the density of the CMC article formed from CMC preform 102, and/or reduce/eliminate the size and/or number of reduced-infiltration areas in CMC preform 102 after performing the infiltration process using system 100, as discussed herein. Increasing the density, and/or reducing/eliminating the size and/or number of reduced-infiltration areas in CMC preform 102 using system 100, may reduce/eliminate the amount of potential defects in the CMC article formed from CMC preform 102 and/or may increase the operational life and/or operational efficiency of the CMC article.

Although discussed and shown herein as second supply conduit 126 formed in die set 104 to supply or flow molten densifier 118 in the second flow direction (D2), it is understood that CMC preform 102 may be positioned or oriented in opening 110 to align ply stacks 134, 136 and second supply conduit 126. That is, in addition to knowing that second supply conduit 126 is formed in second location 128 of die set 104, the predetermined, unidirectional material orientation for each ply stack 134, 136 may also be known. As such, CMC preform 102 may be positioned and/or oriented in opening 110 of die set 104 to substantially align the predetermined, unidirectional material orientation of at least one ply stack 134, 136 of CMC preform 102 with the second flow direction (D2) of molten densifier 118 supplied by second supply conduit 126. As discussed herein, aligning the predetermined, unidirectional material orientation of ply stacks 134, 136 with the second flow direction (D2) may improve the density of the CMC article formed from CMC preform 102, and/or reduce/eliminate the size and/or number of reduced-infiltration areas in CMC preform 102.

Figure 4:
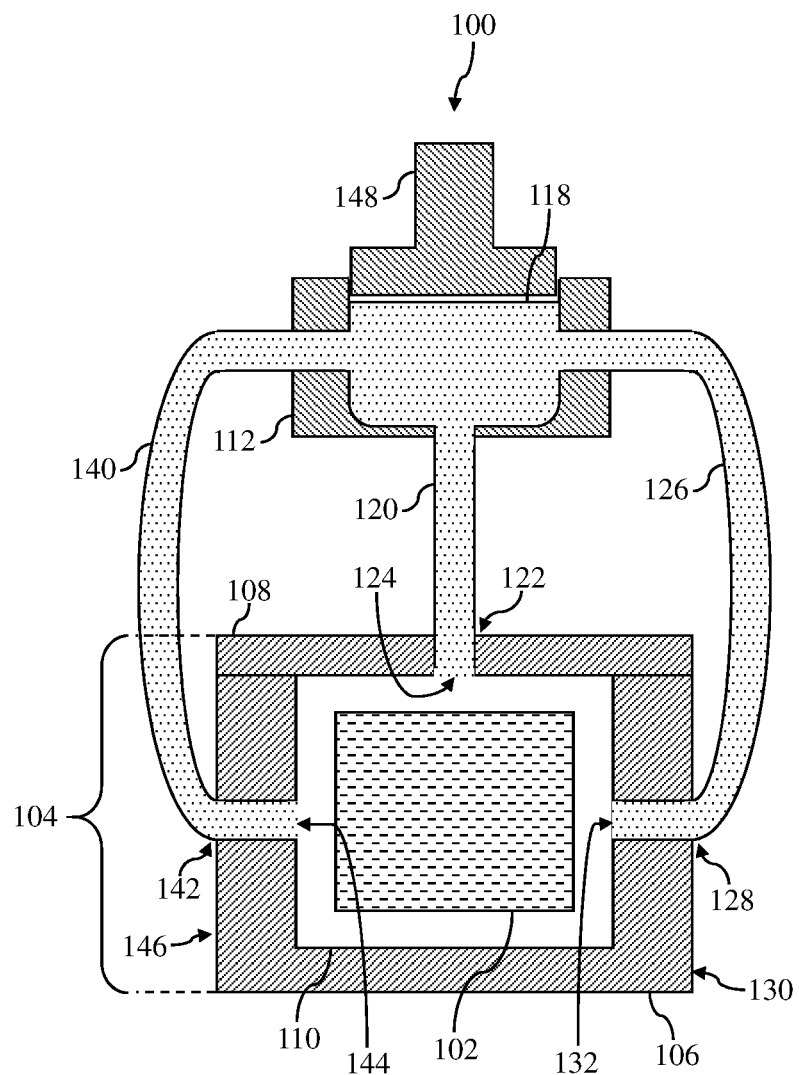
FIG. 4 shows a front cross-sectional of a system and a CMC preform, according to additional embodiments of the disclosure.

FIG. 4 shows another non-limiting example of system 100. Specifically, FIG. 4 shows a front cross-sectional view of another non-limiting example of system 100. It is understood that similarly numbered and/or named components may function in a substantially similar fashion. Redundant explanation of these components has been omitted for clarity.

As shown in FIG. 4, system 100 may also include a third molten densifier supply conduit 140 ("third supply conduit 140"). Third supply conduit 140 may be in communication with molten densifier source 112 for receiving molten densifier 118 included therein. Additionally, and similar to first supply conduit 120 and second supply conduit 126, third supply conduit 140 may be in communication with opening 110 of die set 104 via an inlet 144, and/or may couple molten densifier source 112 to opening 110 of die set 104. In the non-limiting example, third supply conduit 140 may be in communication with die set 104 in a third location 142 of die set 104, distinct from first location 122 and second location 128. As shown in FIG. 3, third location 142 of third supply conduit 140 may be at and/or through a sidewall 146 of first portion 106 of die set 104, opposite sidewall 130. Additionally, third location 142 of third supply conduit 140 may also be substantially adjacent to, next to, and/or horizontal from opening 110 and/or CMC preform 102 positioned within opening 110 of die set 104.

As similarly discussed herein with respect to FIGS. 1-3, third supply conduit 140 may provide, supply, and/or flow molten densifier 118 to opening 110 in a third flow direction (D3) to infiltrate the plurality of voids 138 of CMC preform 102 formed between each ply stacks 134, 136. In the non-limiting example shown in FIG. 4, the third flow direction (D3) defined by third supply conduit 140 may be distinct from the first flow direction (D1) defined by first supply conduit 120, but may be substantially similar or identical to the second flow direction (D2) defined by second supply conduit 126. In another non-limiting example discussed herein (FIGS. 5 and 6), the third flow direction (D3) as defined by third supply conduit 140 may be distinct from the first flow direction (D1) and the second flow direction (D2). As similarly discussed herein with respect to second supply conduit 126 of FIGS. 1-3, third flow direction (D3) may be substantially parallel to the predetermined, unidirectional material orientation of ply stack(s) 134, 136 of CMC preform 102. That is, where CMC preform 102 shown in FIG. 4 includes similar ply stack 134, 136 configurations as shown in FIG. 3, molten densifier 118 may flow and/or be supplied in third flow direction (D3) substantially parallel with the predetermined, unidirectional material orientation of ply stacks 134 of CMC preform 102. As a result, third supply conduit 140 may supply molten densifier 118 to flow through, fill, and/or infiltrate voids 138 of CMC preform 102 to improve the density of the CMC article formed from CMC preform 102, and/or reduce/eliminate the size and/or number of reduced-infiltration areas in CMC preform 102, as discussed herein.

Additionally, as shown in FIG. 4, system 100 may include a plunger 148 in communication with molten densifier source 112. That is, plunger 148 may be connected and/or interact with molten densifier source 112 to apply a force to molten densifier 118 included in molten densifier source 112. By applying a force, plunger 148 may push and/or drive molten densifier 118 through first supply conduit 120, second supply conduit 126, and third supply conduit 140 to opening 110 of die set 104 to flow through CMC preform 102, as discussed herein. The force applied by plunger 148 may be substantially controlled and/or varied to control and/or adjust the pressure and/or velocity of the molten densifier 118 flowing through the respective supply conduits 120, 126, 140. As such, and distinct form the gravity fed system discussed in the non-limiting example shown in FIGS. 1-3, system 100 of FIG. 4 may supply molten densifier 118 over CMC preform 102 in the first flow direction (D1), the second flow direction (D2), and/or the third flow direction (D3) at a pressure above or greater than atmospheric pressure.

Figure 5:
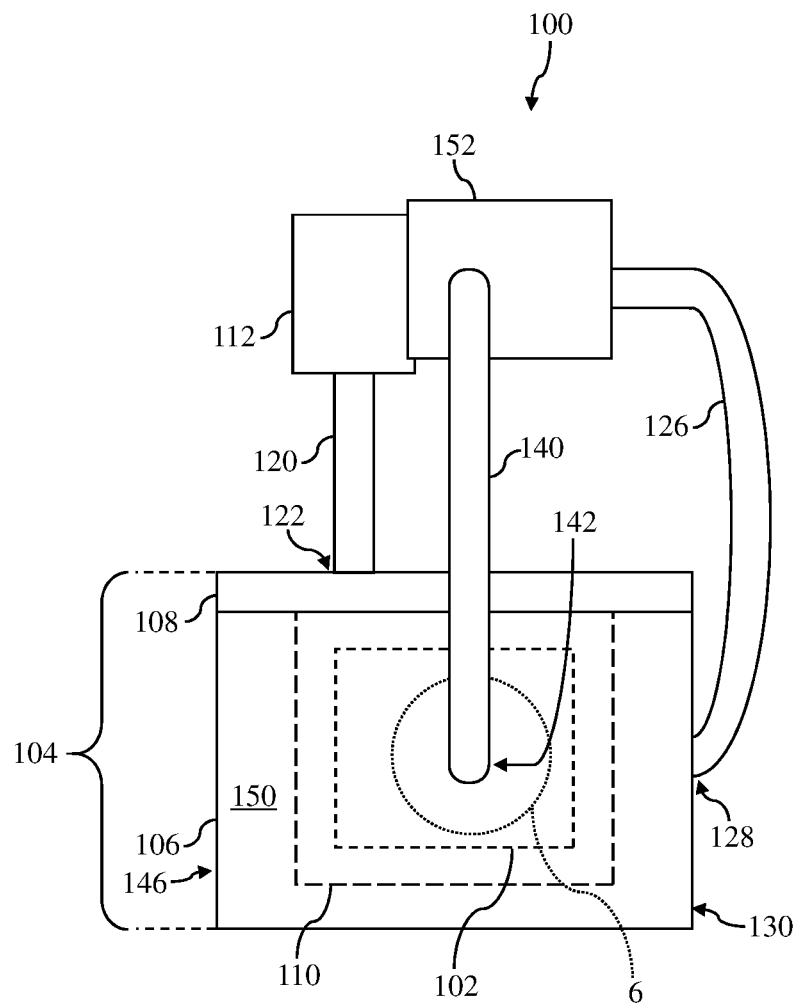
FIG. 5 shows another schematic view of a system for infiltrating a porous ceramic matrix composite (CMC) preform to form a CMC article, according to further embodiments of the disclosure.
Figure 6:
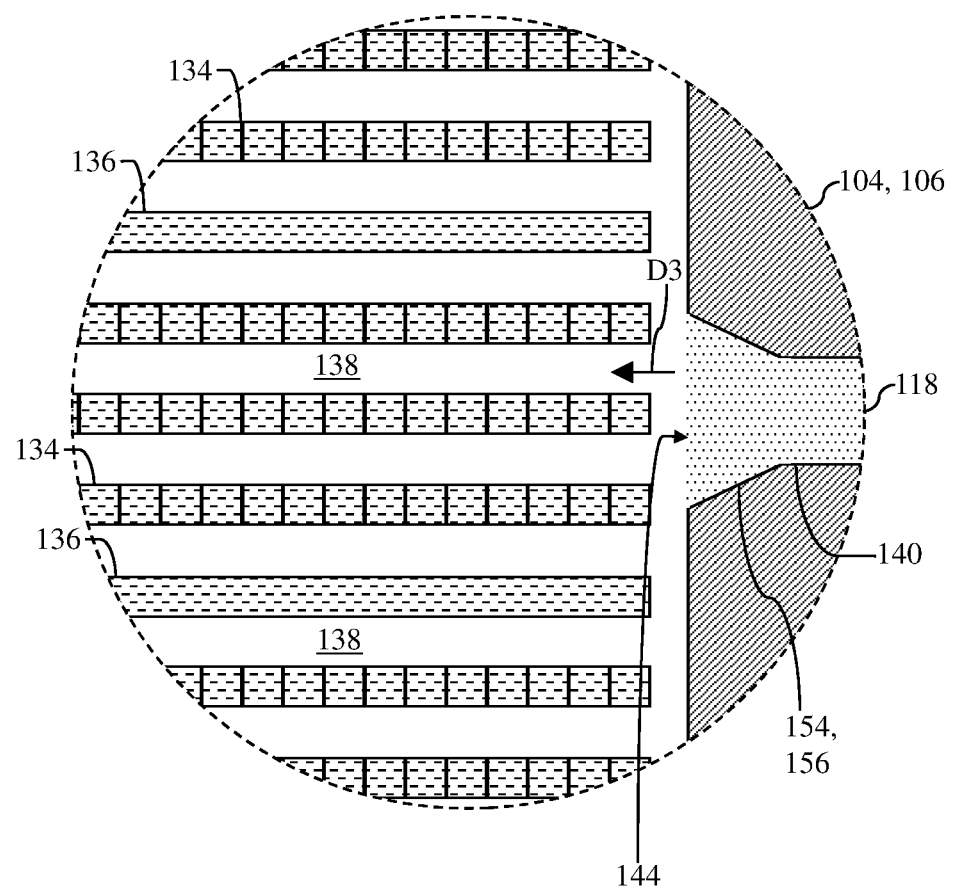
FIG. 6 shows an enlarged view of a portion of FIG. 5 including the system and the CMC preform, according to embodiments of the disclosure.

FIGS. 5 and 6 show an additional non-limiting example of system 100. Specifically, FIG. 5 shows a front view of the additional non-limiting example of system 100, and FIG. 6 shows an enlarged, side cross-section view of a portion of FIG. 5 including third supply conduit 140 of system 100, and CMC preform 102. It is understood that similarly numbered and/or named components may function in a substantially similar fashion. Redundant explanation of these components has been omitted for clarity.

As shown in FIG. 5, third supply conduit 140 may be positioned in a distinct location on die set 104 than discussed herein with respect to FIG. 4. For example, third supply conduit 140 may be in communication with die set 104 in third location 142 of die set 104, distinct from first location 122 and second location 128, located at and/or through a sidewall 150 of first portion 106 of die set 104. Sidewall 150 may be formed and/or positioned between opposing sidewalls 130, 146. As discussed herein, third supply conduit 140 may be formed through sidewall 150 and/or in third location 142 of die set 104 to flow and/or supply molten densifier 118 to opening 110 in third flow direction (D3) to infiltrate the plurality of voids 138 of CMC preform 102 formed between each ply stacks 134, 136.

The non-limiting example of system 100 shown in FIG. 5 may also include a distinct molten densifier source 152. In the example, first supply conduit 120 may be in communication with molten densifier source 112, while second supply conduit 126 and third supply conduit 140 may be in communication with distinct molten densifier source 152. In one non-limiting example, distinct molten densifier source 152 may include similar molten densifier 118 as molten densifier source 112. Alternatively, distinct molten densifier source 152 may include a distinct molten densifier than molten densifier 118 included in molten densifier source 112. In this non-limiting example, the distinct molten densifier included in distinct molten densifier source 152 may include distinct material, compositional, and/or physical properties than molten densifier 118 to improve the infiltration and/or densification of CMC preform 102, as discussed herein.

Turning to FIG. 6, and with continued reference to FIG. 5, an enlarged, side cross-section view of a portion of system 100 is shown. CMC preform 102 shown in FIG. 6 may be identical to CMC preform 102 shown and discussed herein with respect to FIG. 3. As such, CMC preform 102 of FIG. 6 may include a similar pattern and/or order in which ply stacks 134, 136 are stacked, positioned on one another, and/or oriented. However, because FIG. 6 depicts a side view, not a front view like FIG. 3, the predetermined, unidirectional material orientation for each ply stack 134, 136 of CMC preform may be opposite than that shown in FIG. 3. That is, and as shown in FIG. 6, ply stacks 134 may include fibers having the predetermined, unidirectional material orientation that extend through and/or in-and-out of the page when viewed in the side cross-sectional view, while ply stacks 136 include fibers having the predetermined, unidirectional material orientation that extend across and/or from left-to-right on the page when viewed in the side cross-sectional view.

As shown in FIG. 6, and as discussed herein, third supply conduit 140 may be formed in die set 104 in third location 142 (e.g., sidewall 146—FIG. 4, sidewall 150—FIG. 5) to supply or flow molten densifier 118 to opening 110 and/or flow molten densifier 118 over CMC preform 102 in the third flow direction (D3). In the non-limiting example, the third flow direction (D3) defined by third supply conduit 140 formed in third location 142 and/or through sidewall 146, 150 may be distinct from both the first flow direction (D1) defined by first supply conduit 120 and the second flow direction (D2) defined by second supply conduit 126. Also shown in FIG. 6, the third flow direction (D3) may be substantially parallel with the predetermined, unidirectional material orientation of at least one ply stack 134, 136 of CMC preform 102. More specifically, the third flow direction (D3) of molten densifier 118 flowed, supplied, and/or provided by third supply conduit 140 may be substantially parallel to the predetermined, unidirectional material orientation of ply stacks 136 of CMC preform 102.

By orienting third supply conduit 140 (and/or inlet 144) to flow molten densifier 118 in the third flow direction (D3), substantially parallel with the predetermined, unidirectional material orientation of ply stacks 136 of CMC preform 102, molten densifier 118 may flow through, fill, and/or infiltrate voids 138 of CMC preform 102 more efficiently and/or more effectively. Flowing molten densifier substantially parallel with the predetermined, unidirectional material orientation of ply stacks 136 of CMC preform 102 may improve the density of the CMC article formed from CMC preform 102, and/or reduce/eliminate the size and/or number of reduced-infiltration areas in CMC preform 102 after performing the infiltration process using system 100, as discussed herein.

Additionally in this non-limiting example, and as similarly discussed herein with respect to FIG. 3, the second flow direction (D2) (not shown) of molten densifier 118 flowed, supplied, and/or provided by second supply conduit 126 may be substantially parallel to the predetermined, unidirectional material orientation of ply stacks 134 of CMC preform 102. As a result, second supply conduit 126 and third supply conduit 140 of system 100 each may flow molten densifier 118 in a specific flow direction (D2, D3) that is parallel to either ply stacks 134 or ply stacks 136. System 100, as shown in FIG. 6, may further improve the efficiency and/or effectiveness in which the voids 138 formed between ply stacks 134, 136 of CMC preform 102 are filled, and ultimately improve the infiltration and/or densification of CMC preform 102, as discussed herein.

At least one supply conduit 120, 126, 140 of system 100 may also include a feature 154 formed on and/or adjacent inlet 124, 132, 144. Feature 154 of supply conduit 120, 126, 140 may aid in controlling and/or adjusting (e.g., increasing, decreasing) the pressure and/or velocity in which molten densifier 118 is supplied and/or flowed to opening 110 of die set 104 for system 100. In the non-limiting example shown in FIG. 6, feature 154 of third supply conduit 140 may include an enlarged portion 156 of third supply conduit 140 formed adjacent to and/or within inlet 144. Enlarged portion 156 may include a varying diameter or geometry that may be greater than the diameter or geometry of the remainder of third supply conduit 140. The inclusion of enlarged portion 156 in third supply conduit 140 may control, and more specifically reduce, the velocity of molten densifier 118 before it enters opening 110 to flow over CMC preform 102 in the third flow direction (D3). Additionally, enlarged portion 156 in third supply conduit 140 may control, and more specifically reduce, the pressure of molten densifier 118 before it enters opening 110. Controlling the pressure and/or velocity of the molten densifier 118 may control and/or improve the infiltration and/or densification of CMC preform 102, as discussed herein.

Figure 7:
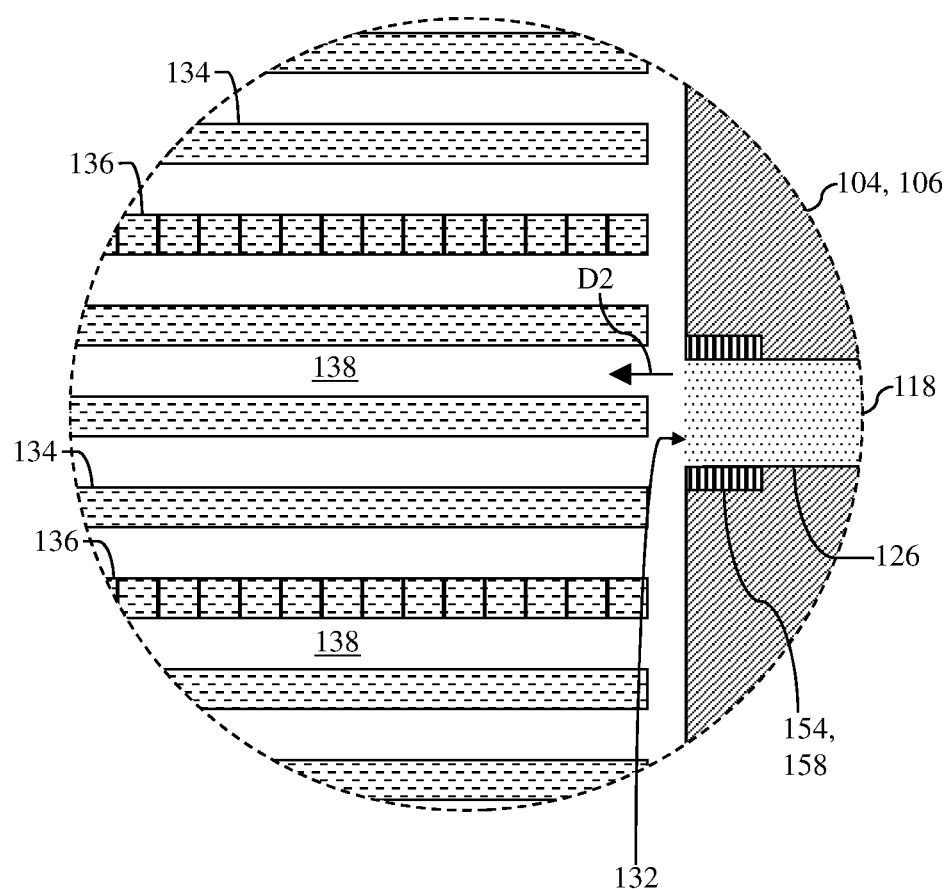
FIG. 7 shows an enlarged view of a portion of FIG. 5 including the system and the CMC preform, according to additional embodiments of the disclosure.

In another non-limiting example, feature 154 may include an adjustable valve 158. As shown in FIG. 7, second supply conduit 126 may include adjustable valve 158 formed adjacent inlet 132. Adjustable valve 158 may vary the diameter or geometry of a portion of second supply conduit 126 positioned adjacent inlet 132. Similar to enlarged portion 156 (FIG. 6), adjustable valve 158 formed in second supply conduit 126 may control or adjust (e.g., increase, decrease, maintain) the velocity and/or pressure of molten densifier 118 before it enters opening 110 to flow over CMC preform 102 in the second flow direction (D2). That is, by adjusting the diameter or geometry of the portion of second supply conduit 126 positioned adjacent opening 132, adjustable valve 158 may control the pressure and/or velocity of the molten densifier 118. In turn, this may improve the infiltration and/or densification of CMC preform 102, as discussed herein.

Although shown and discussed herein as only be included in second supply conduit 126 (FIG. 7) or third supply conduit 140 (FIG. 6), it is understood that any supply conduit 120, 126, 140 of system 100 may include feature 154 for controlling the velocity and/or pressure for molten densifier 118. For example, first supply conduit 120 of system 100 may also include feature 154 (enlarged portion 156, adjustable valve 158) formed in and/or adjacent inlet 124 to control the velocity and/or pressure of molten densifier 118 supplied or flowed to opening 110 of die set 104 in the first flow direction (D1). Additionally, it is understood that any combination of supply conduits 120, 126, 140 of system may include features 154 for controlling the velocity and/or pressure for molten densifier 118. For example, both first supply conduit 120 and second supply conduit 126 may include features 154 formed therein.

Figure 8:
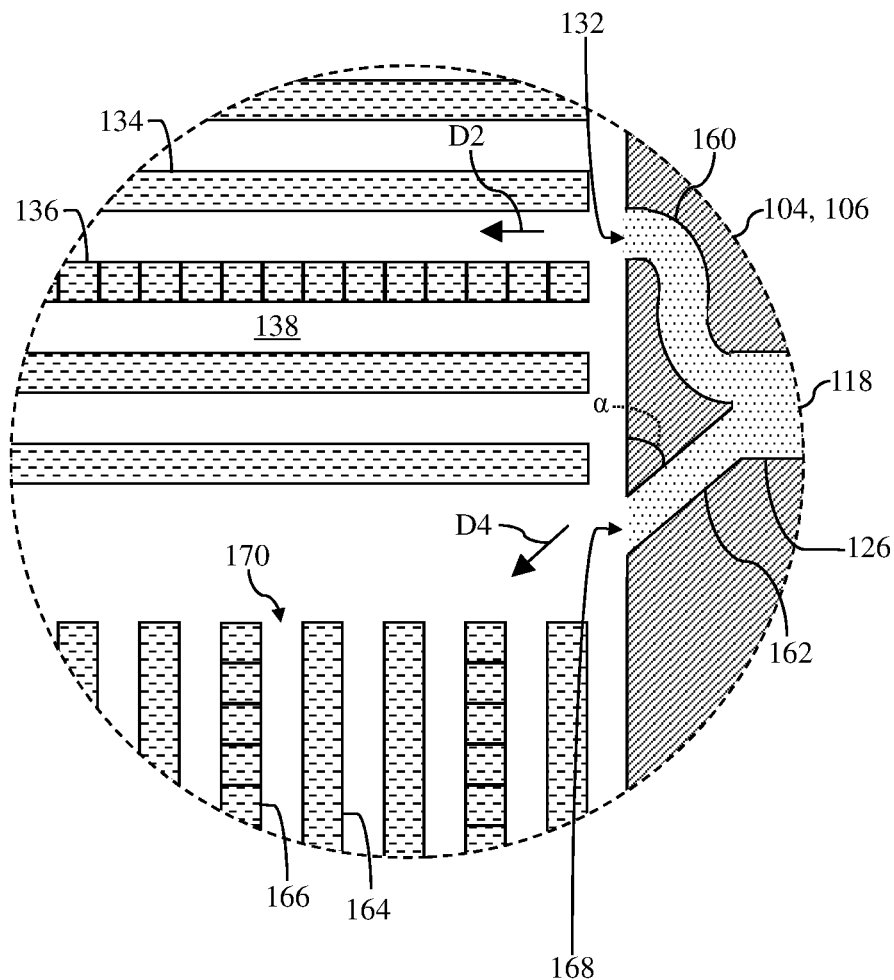
FIG. 8 shows an enlarged view of a portion of FIG. 5 including the system and the CMC preform, according to another embodiment of the disclosure.

FIG. 8 shows another non-limiting example of second supply conduit 126 of system 100. In the non-limiting example, second supply conduit 126 may include a splitter or partition which divides second supply conduit 126 into two distinct section 160, 162. Second supply conduit 126 may include two distinct sections 160, 162 for providing molten densifier 118 in two distinct flow directions to infiltrate CMC preform 102. That is, and as shown in FIG. 8, the non-limiting example of CMC preform 102 may include ply stacks 134, 136, 164, 166 that may be oriented and/or stacked in distinct patterns from one another. For example, the portion of CMC preform 102 shown in FIG. 8 may include ply stacks 134, 136 stacked, patterned, and/or oriented in a similar manner as discussed herein with respect to FIG. 3 Additionally, the portion of CMC preform 102 shown in FIG. 8 may include ply stacks 164, 166 that may be positioned below ply stacks 134, 136 and may be oriented, positioned, and/or stacked substantially perpendicular to ply stacks 134, 136, based on a desired structure and/or configuration of CMC preform 102. Ply stacks 164 may include fibers having a first predetermined, unidirectional material orientation that extend over and/or from top-to-bottom of the page when viewed in the cross-sectional view of FIG. 6. Ply stacks 166 may include fibers having a distinct predetermined, unidirectional material orientation that extend through and/or in-and-out of the page when viewed in the cross-sectional view.

Each distinct section 160, 162 of second supply conduit 126 may provide molten densifier 118 in a flow direction that is parallel to a portion of ply stacks 134, 136, 164, 166 of CMC preform 102. For example, and as similarly discussed herein with respect to FIG. 3, first section 160 including inlet 132 may flow and/or supply molten densifier 118 to opening 110 in a second direction (D2) that may be substantially parallel to the predetermined, unidirectional material orientation for ply stacks 134 to fill and/or infiltrate voids 138 formed between ply stacks 134 and ply stacks 136. Additionally, second section 162 of second supply conduit 126 may include inlet 168 that flow and/or supply molten densifier 118 in a fourth flow direction (D4). The fourth flow direction (D4) may not be exactly parallel to the predetermined, unidirectional material orientation for ply stacks 164, but rather angled slightly (α) as a result of the configuration of die set 102 and/or the second location 128 of second supply conduit 126 in die set 102. However, the fourth flow direction (D4) may be substantially close to parallel (e.g., α=15° or less) such that molten densifier 118 flowing in fourth flow direction (D4) from second section 162 of second supply conduit 126 may more effectively and/or more efficiently flow through and/or infiltrate voids 170 formed between ply stacks 164, 166.

FIG. 9 shows another non-limiting example of system 100. Specifically, system 100 of FIG. 9 includes molten densifier source 112 in communication only with first supply conduit 120, and distinct molten densifier source 152 in communication only with second supply conduit 126. Additionally, and distinct from the non-limiting example shown in FIG. 1, first location 122 of first supply conduit 120 may be form in and/or on first portion 106 of die set 104. Specifically, first location 122 of first supply conduit 120 may be at and/or through a bottom 172 of first portion 106 of die set 104, adjacent sidewall 130.

Figure 10:
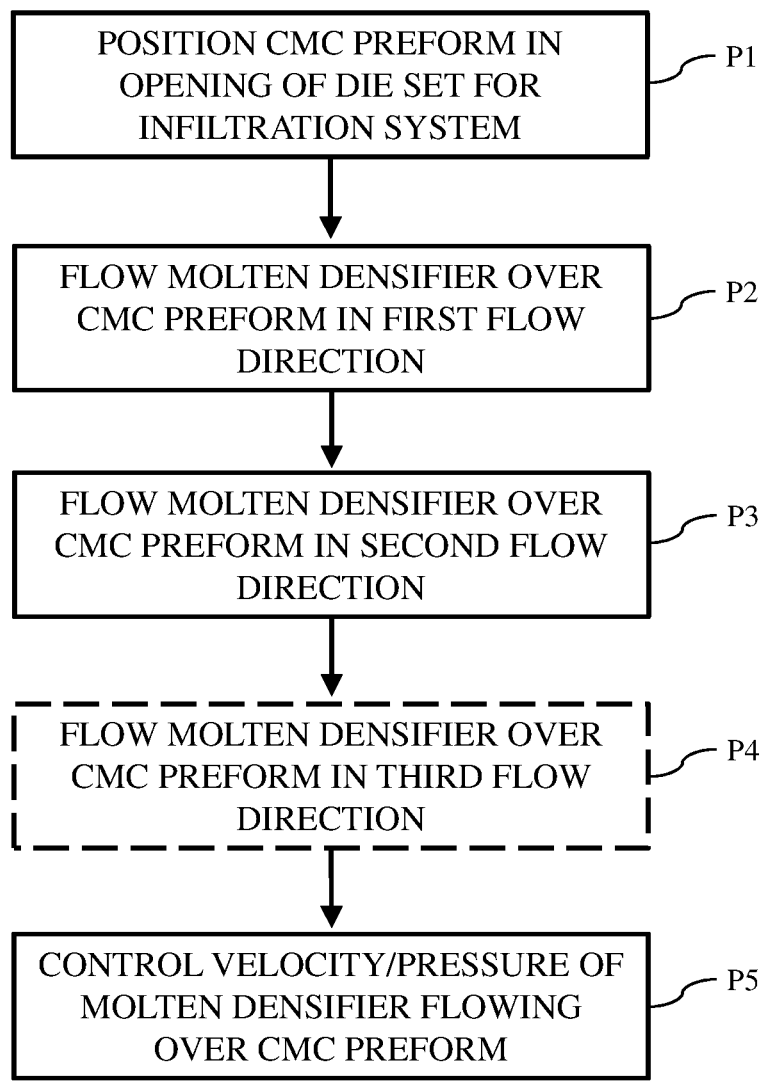
FIG. 10 shows an illustrative flow diagram of example processes for infiltrating porous ceramic matrix composite (CMC) preforms to form CMC articles, according to embodiments of the disclosure.

FIG. 10 show example processes of infiltrating a porous ceramic matric composite (CMC) preform. More specifically, FIG. 10 shows a flow diagram illustrating non-limiting example processes of infiltrating and densifying a CMC preform with molten densifier material. In some cases, the processes may be used to form a CMC article from the infiltrated and densified CMC preform, as discussed herein with respect to FIGS. 1-9.

In process P1, the porous CMC preform may be positioned within an opening of a die set of an infiltration system used to perform the infiltration process. The CMC preform may include a plurality of ply stacks, and a plurality of voids formed between each of the ply stacks. Each of the plurality of ply stacks may include a predetermined, unidirectional material orientation. Positioning the CMC preform in the opening may also include aligning the predetermined, unidirectional material orientation of at least one of the plurality of ply stacks of the CMC preform with a second flow direction of the flowing molten densifier.

In process P2, molten densifier may flow over the CMC preform in a first flow direction. Specifically, molten densifier may flow over the CMC preform in the first flow direction to infiltrate the plurality of voids formed between each of the plurality of ply stacks of the CMC preform. The first flow direction may be substantially perpendicular to the predetermined, unidirectional material orientation of at least one of the plurality of ply stacks forming the CMC preform. Flowing the molten densifier in the first flow direction may also include supplying the molten densifier over the CMC preform in the first flow direction at a pressure equal to or above atmospheric pressure.

In process P3, molten densifier may flow over the CMC preform in a second flow direction. Specifically, molten densifier may flow over the CMC preform in the second flow direction to infiltrate the plurality of voids formed between each of the plurality of ply stacks of the CMC preform. The second flow direction may be distinct from the first flow direction. Additionally, the second flow direction may be substantially parallel to the predetermined, unidirectional material orientation of at least one of the plurality of ply stacks forming the CMC preform. Flowing the molten densifier in the second flow direction may also include supplying the molten densifier over the CMC preform in the second flow direction at a pressure greater than or above atmospheric pressure.

In process P4 (shown in phantom as optional), molten densifier may flow over the CMC preform in a third flow direction. Specifically, molten densifier may flow over the CMC preform in the third flow direction to infiltrate the plurality of voids formed between each of the plurality of ply stacks of the CMC preform. The third flow direction may be distinct from the first flow direction. In non-limiting examples, the third flow direction may be identical to or distinct from the second flow direction. Additionally, the third flow direction may be substantially parallel to the predetermined, unidirectional material orientation of at least one distinct ply stack of the plurality of ply stacks forming the CMC preform. The distinct ply stack identified in process P4 may be different from or distinct from the ply stack of process P3. Flowing the molten densifier in the third flow direction may also include supplying the molten densifier over the CMC preform in the third flow direction at a pressure greater than or above atmospheric pressure.

In process P5, the velocity and/or the pressure of the molten densifier may be controlled. More specifically, the velocity and/or the pressure of the molten densifier flowing in the first direction (process P2), the second direction (process P3), and the third direction (process P4) over the CMC preform may be controlled and/or adjusted (e.g., increased, decreased, maintained) to aid in the infiltration and/or densification of the CMC preform. The velocity and/or the pressure of the molten densifier may be controlled using a feature positioned within and/or adjacent a supply conduit of the infiltration system flowing and/or supplying the molten densifier. The feature may include, but is not limited to, an enlarged portion (e.g., inlet) of the supply conduit or an adjustable valve in communication with the supply conduits.

Technical effects of the disclosure are to provide a method and system for flowing molten densifiers parallel to predetermined, unidirectional material orientations of ply stacks for porous ceramic matrix composite (CMC) preform to improve the infiltration and/or densification of the CMC preforms.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/-10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for infiltrating a porous ceramic matrix composite (CMC) preform, the method comprising:
    positioning the porous CMC preform in an opening of a die set for an infiltration system, the CMC preform including:
        a plurality of ply stacks, each of the plurality of ply stacks selected from the group consisting of a first ply stack having a first predetermined, unidirectional material orientation and a second ply stack having a second predetermined, unidirectional material orientation substantially perpendicular to the first predetermined, unidirectional material orientation, and
        a plurality of voids formed between each of the plurality of ply stacks;
    flowing a molten densifier from a molten densifier source through a first supply conduit that extends from a first opening at a first side of the molten densifier source directly into the die set at a first inlet location and over the porous CMC preform in a first flow direction to infiltrate the plurality of voids;
    flowing the molten densifier from the molten densifier source through a second supply conduit that extends from a second opening at a second side of the molten densifier source directly into the die set at a second inlet location and over the porous CMC preform in a second flow direction, distinct from the first flow direction, to infiltrate the plurality of voids; and
    flowing the molten densifier from the molten densifier source through a third supply conduit that extends from the molten densifier source into the die set at a third inlet location over the porous CMC preform in a third flow direction to infiltrate the plurality of voids,
    wherein the second supply conduit is distinct and separate from the first supply conduit, wherein the first supply conduit and the second supply conduit each receives molten densifier directly from the molten densifier source independent of communication with the other of the first supply conduit and the second supply conduit, the first inlet location into the die set is distinct and separate from the second inlet location, and
    wherein the second flow direction is substantially parallel to the first predetermined, unidirectional material orientation of the first ply stack and the third flow direction is substantially parallel to the second predetermined, unidirectional material orientation of the second ply stack.

2. The method of claim 1, wherein the first flow direction is substantially perpendicular to the first predetermined, unidirectional material orientation of the first ply stack and the second predetermined, unidirectional material orientation of the second ply stack.

3. The method of claim 1, wherein positioning the porous CMC preform in the opening of the die set includes:
    aligning the first predetermined, unidirectional material orientation of the first ply stack with the second flow direction of the flowing molten densifier.

4. The method of claim 1, wherein flowing the molten densifier over the porous CMC preform in the first flow direction further includes:
    supplying the molten densifier over the porous CMC preform in the first flow direction at a pressure equal to or above atmospheric pressure.

5. The method of claim 1, wherein flowing the molten densifier over the porous CMC preform in the second flow direction further includes:
    supplying the molten densifier over the porous CMC preform in the second flow direction at a pressure above atmospheric pressure.

6. The method of claim 1,
    wherein the molten densifier source stores molten densifier to be supplied directly from and through the third supply conduit, and wherein the third supply conduit is distinct and separate from the first supply conduit and the second supply conduit, wherein the first supply conduit, the second supply conduit, and the third supply conduit each receives molten densifier directly from the molten densifier source independent of communication with others of the first supply conduit the second supply conduit, and the third supply conduit, the third inlet location into the die set is distinct and separate from the first inlet location and the second inlet location.

7. The method of claim 6, wherein the second first flow direction is substantially perpendicular to the first predetermined, unidirectional material orientation of the first ply stack and the second predetermined, unidirectional material orientation of the second ply stack.

8. The method of claim 1, wherein flowing the molten densifier over the porous CMC preform in at least one of the first flow direction and the second direction further includes:

supplying the molten densifier over the porous CMC preform in at least one of the first flow direction and the second direction at a pressure equal to or above atmospheric pressure, wherein the pressure equal to or above atmospheric pressure is provided by applying a force onto the molten densifier in the molten densifier source and through at least one of the first supply conduit and the second supply conduit and into the die set.

9. The method of claim 1, wherein flowing the molten densifier over the porous CMC preform in the third flow direction further includes:

supplying the molten densifier over the porous CMC preform in the third flow direction at a pressure above atmospheric pressure.

10. The method of claim 1, further comprising at least one of:

controlling a velocity of the molten densifier flowing over the porous CMC preform in the first flow direction, or controlling a velocity of the molten densifier flowing over the porous CMC preform in the second flow direction.

11. The method of claim 1, wherein flowing the molten densifier over the porous CMC preform in the third flow direction includes:

supplying the molten densifier over the porous CMC preform at the pressure equal to or above atmospheric pressure, wherein the pressure equal or to above atmospheric pressure is provided by applying a force onto the molten densifier in the molten densifier supply and through the third supply conduit and into the die set.

* * * * *